United States Patent
Irei et al.

(10) Patent No.: US 6,227,000 B1
(45) Date of Patent: May 8, 2001

(54) AIR CONDITIONING SYSTEM FOR REFRESHMENT UTILIZING RAINWATER

(75) Inventors: Satoshi Irei, Tokyo; Tadashi Asakura, Yokohama, both of (JP)

(73) Assignee: Takachiho Corp., Yokohama (JP)

( * ) Notice: Subject to any disclaimer, the term of this patent is extended or adjusted under 35 U.S.C. 154(b) by 0 days.

(21) Appl. No.: 09/397,127

(22) Filed: Sep. 16, 1999

(30) Foreign Application Priority Data

Nov. 30, 1998 (JP) .................................................. 10-355388

(51) Int. Cl.[7] .................................................. F25D 23/12
(52) U.S. Cl. .................................................. 62/260; 165/45
(58) Field of Search .................................................. 62/260; 165/45

(56) References Cited

U.S. PATENT DOCUMENTS

| | | | | |
|---|---|---|---|---|
| 213,138 | * | 3/1879 | Shepard .................................................. | 62/260 |
| 1,297,633 | * | 3/1919 | Ashley .................................................. | 62/260 |
| 2,178,176 | * | 10/1939 | Lamm .................................................. | 62/260 |
| 2,829,504 | * | 4/1958 | Schlichtig .................................................. | 62/260 |
| 2,986,904 | * | 6/1961 | Williamson .................................................. | 62/260 |
| 3,997,112 | * | 12/1976 | St. Clair .................................................. | 239/13 |
| 4,367,631 | * | 1/1983 | Johnson et al. .................................................. | 62/79 |
| 4,412,426 | * | 11/1983 | Yuan .................................................. | 62/260 |
| 4,449,572 | * | 5/1984 | Lambert .................................................. | 165/1 |
| 5,975,192 | * | 11/1999 | Moratalla et al. .................................................. | 165/45 |

* cited by examiner

Primary Examiner—William Doerrler
Assistant Examiner—Mark Shulman
(74) Attorney, Agent, or Firm—Kanesaka & Takeuchi (57) ABSTRACT

An air conditioning system includes an air duct for receiving and passing air therethrough, a water tank embedded in a ground outside a room, and a fan communicating with the air duct. The air duct extends through the water tank at a predetermined depth to cool the air passing through the air duct. The fan supplies air passing through the water tank into the room to efficiently cool the room.

9 Claims, 6 Drawing Sheets

AIR CONDITIONING SYSTEM FOR REFRESHMENT UTILIZING RAINWATER

BACKGROUND OF THE INVENTION AND RELATED ART STATEMENT

The present invention relates to an energy-saving and refreshing type air conditioning system utilizing rainwater which is used mainly for buildings, such as ordinary houses and public facilities. The system may also be used for clean rooms in semiconductor producing factories or the like, warehouses for storage of foods and goods, civil engineering materials, construction materials or the like.

Conventional air conditioning systems include, for example, (1) a system which comprises introducing air into a pipe, such as a vinyl chloride pipe laid in the ground to cool air in the pipe, and supplying the cooled air into a room, (2) a system which comprises leading water from a well, and passing water through a pipe arranged under a floor to thereby cool air in a room with the water as a cooling medium, and (3) a system which comprises directly passing rainwater stored in a rainwater tank through a pipe arranged under a floor or on a ceiling to thereby cool air in a room with the rainwater as a cooling medium.

The above-described conventional techniques have problems. For example, in the first system, in order to efficiently cool air in the pipe, the pipe is required to be placed in the ground at a depth, for example, 3 m or deeper. This leads to an extremely high cost. On the other hand, if the pipe is laid at a shallow area to prevent such economical disadvantage, air cooling effect is poor. If the pipe is disposed in a large area, a considerably large area is required, resulting in a high cost.

In the second system, a first requirement is that a well is owned. If a well is not available, it is not practical to bore a well with a view to install an air conditioning system in terms of an area of a site and a cost.

In the third system, since rainwater is used as a heat exchange medium, there may be a trouble of water leakage. Further, this system has a problem that a cost of arranging the pipe under a floor or on a ceiling is high, and a maintenance cost is also high.

The present invention has been made in view of the above-described problems inherent in the conventional techniques.

It is, therefore, an object of the present invention to provide an energy-saving and refreshing type air conditioning apparatus utilizing rainwater which is capable of efficiently supplying cool air to a room by directly cooling air drawn from outside the room or air drawn from the room without using water or the like as a heat exchange medium in contrast to the conventional techniques.

Another object of the invention is to provide an air condition apparatus as stated above, which is simply constructed and substantially free from the troubles inherent in the conventional techniques.

A further object of the invention is to provide an air condition method and apparatus as stated above, which are economically advantageous, and can fully utilize the benefit of nature.

SUMMARY OF THE INVENTION

According to one aspect of the present invention, the above object is attained by providing a refreshing type air conditioning system utilizing rainwater, the system comprising a fresh-air intake pipe or under-floor air intake pipe for taking fresh air, an air duct for passing therethrough air taken through the fresh-air intake pipe or under-floor air intake pipe, a rainwater tank embedded in the ground external to a room, and a fan mounted on a wall or ceiling of the room. The air duct extends through the rainwater tank at a predetermined depth in the rainwater tank to cool air in the air duct. The fan supplies cooled air into the room.

It is preferable that the air conditioning system further comprises a condensation dew basin communicating with the air duct for dehumidification. It is also preferable that the air conditioning system further comprises an air-cleaning and deodorizing box communicating with the air duct.

More preferably, the air duct has one end connected to the fresh-air intake pipe or under-floor air intake pipe, and the other end connected to the power-adjustable fan mounted on the wall or ceiling via the condensation dew basin for dehumidification and the cleaning and deodorizing box; the fresh air is dehumidified with the condensation dew basin and cleaned and deodorized with the cleaning and deodorizing box and supplied to the room by the fan to result in ventilation of the room; the rainwater tank is embedded in the ground and always filled to repletion with rainwater; and the air duct is so laid as to extend through the rainwater tank at a predetermined depth to cool air in the air duct.

According to a further aspect of the present invention, the above object is attained by providing a refreshing type air conditioning system utilizing rainwater, the system comprising an air duct for passing air taken through an air outlet provided in a wall or ceiling of a room, a rainwater tank embedded in the ground external to the room, and a fan mounted on the wall or ceiling of the room. The air duct is so laid as to extend through the rainwater tank at a predetermined depth to cool air in the air duct. The fan returns air to the room.

It is preferable that the air conditioning system further comprises a condensation dew basin communicating with the air duct for dehumidification. It is also preferable that the air conditioning system further comprises an air-cleaning and deodorizing box communicating with the air duct.

More preferably, the air duct has one end connected to the air outlet provided in the wall or ceiling, and the other end connected to the power-adjustable fan mounted on the wall or ceiling via the condensation dew basin for dehumidification and the cleaning and deodorizing box; air drawn from the room is dehumidified with the condensation dew basin and cleaned and deodorized with the cleaning and deodorizing box and returned to the room by the fan; the rainwater tank is embedded in the ground and always filled to repletion with rainwater; and the air duct is so laid as to extend through the rainwater tank at a predetermined depth to cool air in the air duct.

In the air conditioning system according to the present invention, the air duct is preferably in a loop-like shape, rectangular spiral shape or meandering shape at the predetermined depth in the rainwater tank. Further, the air duct is preferably made of a vinyl chloride resin pipe. Moreover, rainwater stored in the rainwater tank may preferably be used for flushing of a toilet or sprinkling over a garden, and through an overflow pipe, excess rainwater is preferably allowed to flow into the ground or a water draining basin.

In the refreshing type air conditioning system utilizing rainwater according to the present invention, since air is directly supplied to the room instead of water as a heat exchange medium, energy consumption for the transfer is reduced.

The rainwater tank embedded in the ground constitutes a simplified air conditioning system which utilizes such natural cycle that, in the daytime particularly in summer, rainwater stored in the rainwater tank is used as a cooling medium and, in the night time, rainwater is allowed to cool again through heat exchange between rainwater and soil. In addition, air is directly cooled with the rainwater and supplied to the room, thereby enabling elimination of the drawbacks inherent in the conventional techniques, i.e. complicated pipe arrangement, troubles, such as water leakage due to passing water through the pipe, and also enabling considerable reduction of maintenance cost.

In the air conditioning system where the outside fresh air is taken through the fresh-air intake pipe or the under floor air intake pipe, cooling is effected while effecting ventilation. In this respect, the present invention changes the conventionally established air conditioning concept.

When the blowing power of the fan is adjustable, cooling power can freely be controlled by changing air-flow rate.

DETAILED DESCRIPTION OF PREFERRED EMBODIMENTS

Figure 1:
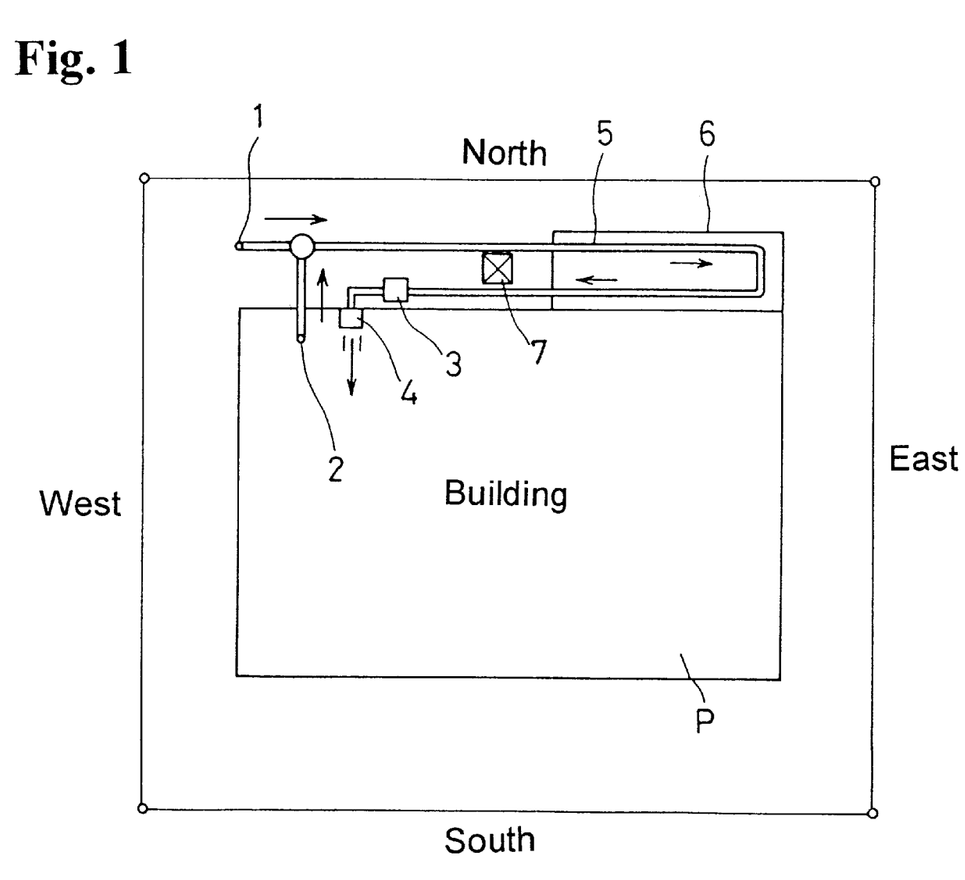
FIG. 1 is an explanatory view for showing installation of a ventilative and refreshing type air conditioning system utilizing rainwater according to the present invention.
Figure 2A:
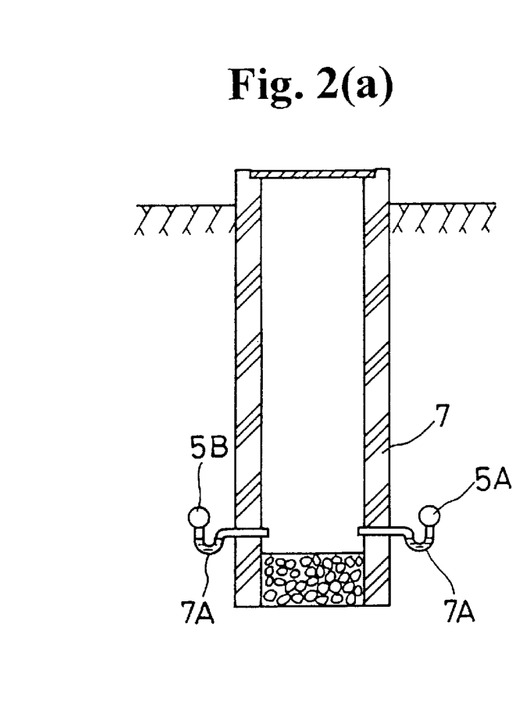
FIG. 2(a) is a sectional view of a condensation dew basin.
Figure 2B:
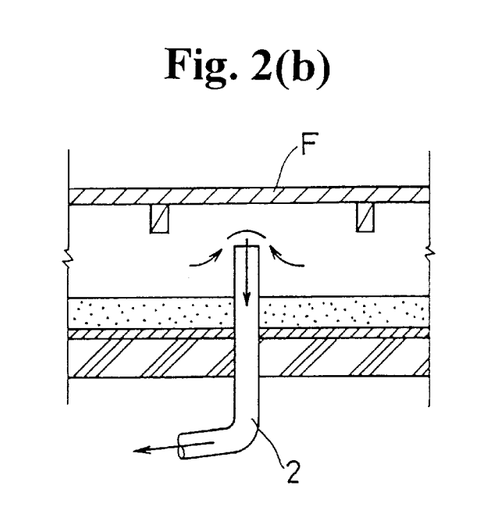
FIG. 2(b) is a side view showing an arrangement of an under-floor air intake pipe.
Figure 2C:
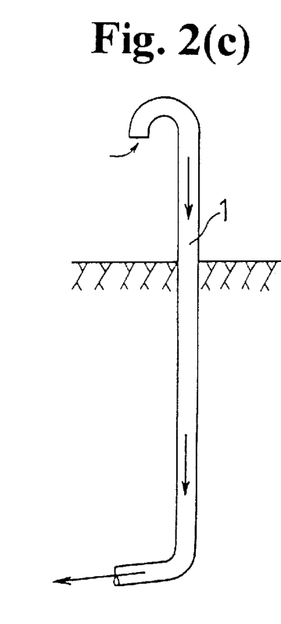
FIG. 2(c) is a side view showing an arrangement of a fresh-air intake pipe.

In the following, an embodiment of the present invention will be described with reference to the drawings. In the embodiment of the present invention, fresh air is taken through a fresh-air intake pipe 1 or an under-floor air intake pipe 2 into an air duct 5 extending through a rainwater tank 6 embedded in the ground outside a room at a predetermined depth to thereby cool air in the air duct 5. Cooled air is supplied into a room by a fan 4 mounted on, for example, a wall W or a ceiling of the room, as shown in FIGS. 1 and 2.

More specifically, the air duct 5 is made of, for example, a pipe having a diameter of about 100 mm and made of a general-purpose polymer, such as a vinyl chloride resin. The air duct 5 has one end connected to the fresh-air intake pipe 1 located outside a building P and having an inverted U-shape, or to the under-floor air intake pipe 2 located under a floor F of the building P and having a form of a vertical portion with a hood. The other end of the air duct 5 is connected to the fan 4, which is variable in the rotational number to adjust blowing power and mounted on the wall W or the ceiling, via an air-cleaning and deodorizing box 3 with a lid containing a laminated air-cleaning filter 3A and a deodorant 3B including charcoal and activated charcoal (see FIG. 4). Thus, fresh air cleaned and deodorized through the cleaning and deodorizing box 3 is supplied to the room by the fan 4 and to effect ventilation of the room as well.

The air duct 5 extends in its course through the rainwater tank 6, which is embedded in the ground external to the room and which is always filled to repletion with rainwater, at a predetermined depth in the rainwater tank 6 to cool air in the air duct 5, thereby constituting an air conditioning system of a so-called ventilative and refreshing type utilizing rainwater.

The rainwater tank 6 is made of, for example, concrete and formed into, for example, a substantially box-like shape. The rainwater tank 6 is embedded in the ground outside the building P, for example, on the north side of the building P (see FIG. 1) with its opening substantially flush with the ground surface (see FIG. 3). Intake of rainwater into the rainwater tank 6 is carried out although not illustrated, for example, in such a manner that rainwater is collected through rainwater gutters mounted on a roof for collecting rain which falls on the roof and through rainwater pipes connected to the rainwater gutters, the collected rainwater is led to three basins where soil and the like contained in the rainwater is allowed to sediment, and then the cleaned rainwater is sent to the rainwater tank 6. In case of shortage of rainwater supply due to a spell of fine weather, service water is supplied to regulate an amount of water stored in the rainwater tank 6. This enables continuous cooled air supply without influence of weather.

Figure 3:
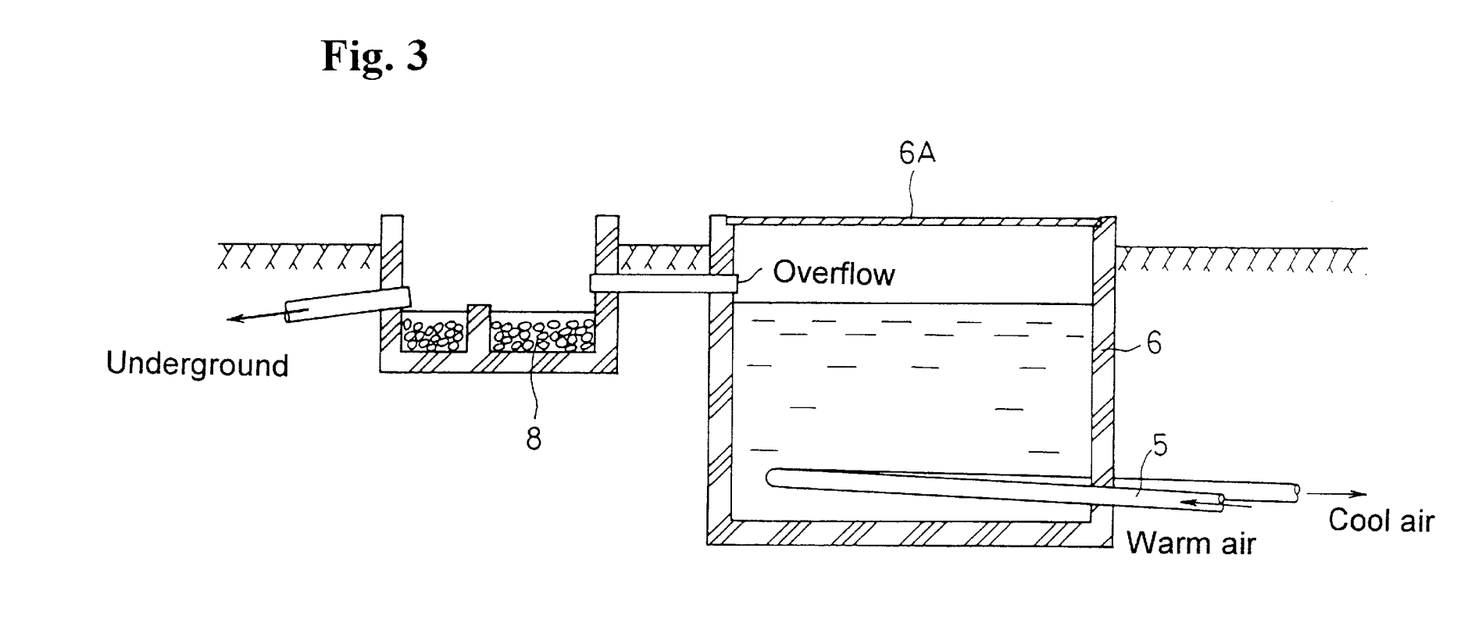
FIG. 3 is an explanatory sectional view showing a rainwater tank and its vicinities.

As shown in FIG. 3, the air duct 5 is so laid as to, in its course, extend through the rainwater tank 6 at a predetermined depth in the rainwater tank 6, for example, in the shape of a horizontal loop. At the opening of the rainwater tank 6, a lid 6A, such as a mesh lid, is detachably mounted. Rainwater stored in the rainwater tank 6 may be used for flushing of a toilet or water sprinkling over a garden. On the other hand, as further shown in FIG. 3, excess rainwater is first permitted to flow through an overflow pipe into an external cistern 8 divided into a plurality of sections, and then the rainwater is allowed to flow into the ground or drain into a water draining basin.

Figure 5:
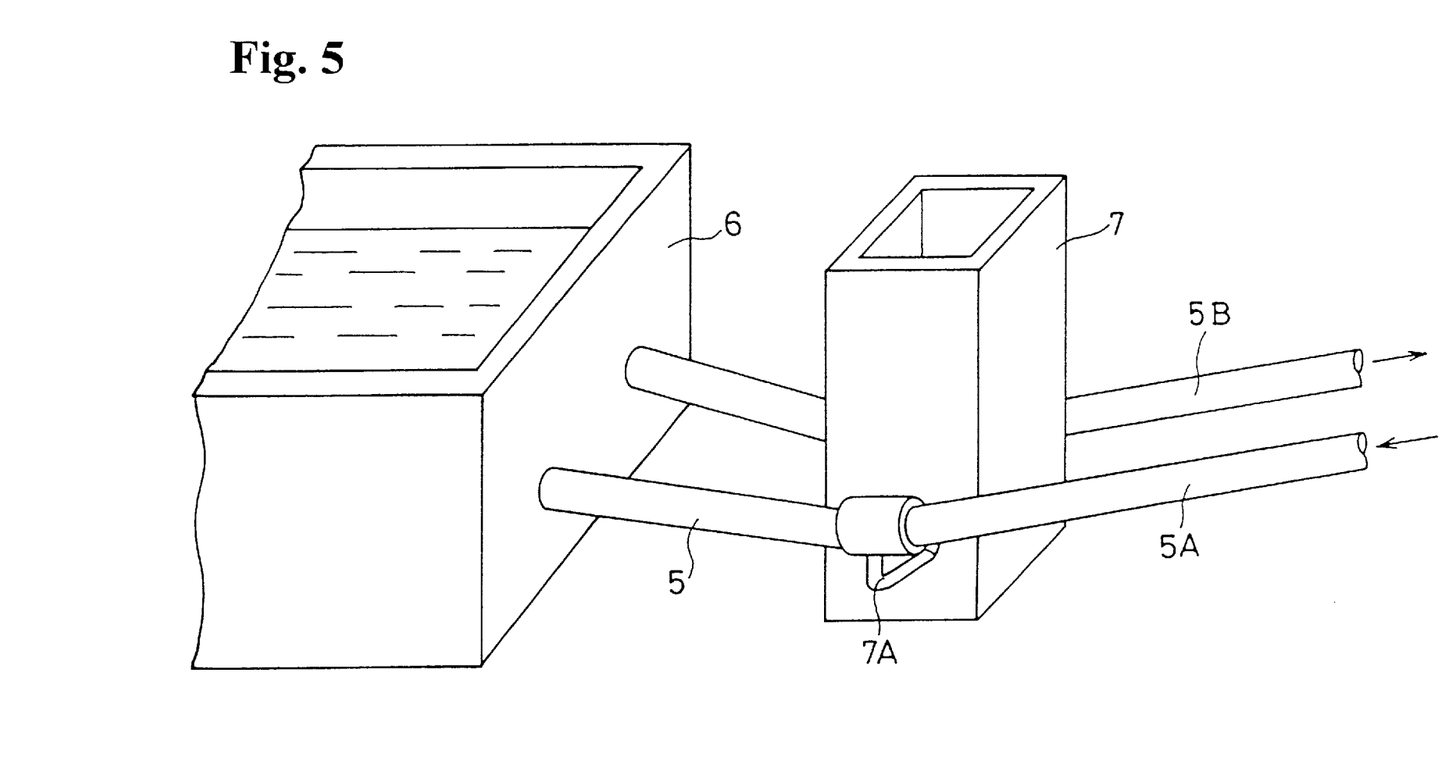
FIG. 5 is a perspective view of the embodiment showing a condensation dew basin and its vicinities.

As shown in FIG. 5, a condensation dew basin 7 for dehumidification is disposed in the vicinity of the tank 6 to cross a portion 5A of the air duct 5 for introduction of air into the rainwater tank 6 and a portion 5B of the air duct 5 for delivery from the rainwater tank 6. The condensation dew basin 7 is connected to communicate with the introduction portion 5A and the delivery portion 5B via a pair of U-shaped connecting pipes 7A. As shown in FIG. 2(a), the condensation dew basin 7 is embedded in the ground with its opening substantially flush with the ground surface and provided with a lid.

Further, as shown in FIG. 5, an upstream portion of the introduction portion 5A for introducing air to the condensation dew basin 7, such as fresh air or air drawn from the room, and a downstream portion of the delivery pipe 5B for delivering cooled air to the room, are slanted slightly upward to form elevation angles. Likewise, a downstream portion of the introduction portion 5A and an upstream portion of the delivery portion 5B, which extend between the rainwater tank 6 and the condensation dew basin 7, are slightly upward slanted to form elevation angles toward the rainwater tank 6. By virtue of the inclinations, condensation dew which develops in the air duct 5 in the ground and in the rainwater tank 6 is allowed to run into the condensation dew basin 7.

As described above, the air conditioning system of a so-called ventilative and refreshing type utilizing rainwater is constructed, wherein air drawn from the outside of the room or from under the floor F passes through the air duct 5 extending through the rainwater tank 6 by the blowing power-adjustable fan 4 to cool air with rainwater, and after dehumidifying, cleaning and deodorizing, cooled air is supplied to the room.

It is to be noted that thermal capacity of soil is about 700 kcal/m³C°, whereas thermal capacity of water is 1,000 kcal/m³C°. Accordingly, using of rainwater exhibits about 40 percent greater effect than that of soil. In other words, in terms of air cooling effect, an air duct submerged in water is equivalent to the same air duct laid in soil which has a length about 40 percent greater than that of the air duct submerged in water. Therefore, the air conditioning type utilizing rainwater is about 1.4 times as efficient as the conventional air conditioning type using only the air duct (cooling tube) laid in the ground.

Further, soil conducts heat slowly. Accordingly, if air-flow rate passing through the air duct (cooling tube) laid in the ground is increased, air temperature lowering effect is impaired. On the other hand, water has a heat conductivity higher than that of soil, and convection occurs in water. Accordingly, air may pass through the air duct extending through the rainwater tank at an air-flow rate higher than that in the air conditioning type using only the air duct (cooling tube) laid in the ground. The air conditioning type utilizing rainwater is superior in efficiency to the air conditioning type using only the air duct (cooling tube) laid in the ground.

Although illustration is omitted, the air conditioning system of the present invention may be of a so-called room air circulation type which comprises passing air drawn from a room through the air duct 5 into the rainwater tank 6 to cool air, and returning the cooled air into the room. In this case, the air duct 5 has its one end connected to an outlet on a wall W or ceiling of the room, and the other end connected to the blowing power-adjustable fan 4 mounted on the wall W or ceiling via the condensation dew basin 7 for dehumidification and the air-cleaning and deodorizing box 3. Air dehumidified with the condensation dew basin 7 and cleaned and deodorized through the cleaning and deodorizing box 3 is returned into the room by the fan 4. The air duct 5 is so laid as to, in its course, extend through the rainwater tank 6, which is embedded in the ground external to the room and always filled to repletion with rainwater, at a predetermined depth in the rainwater tank 6 to thereby cool air in the air duct 5.

Figure 6A:
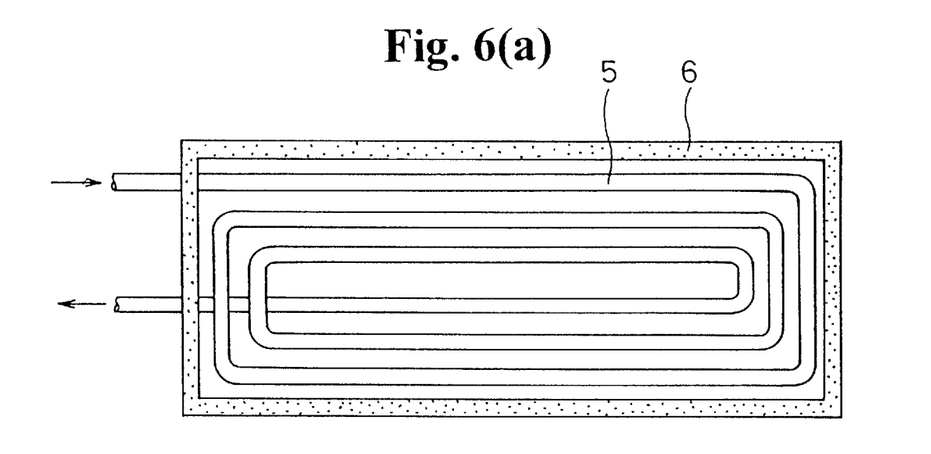
FIGS. 6(a) and 6(b) show different examples of the air duct in the rainwater tank.
Figure 6B:
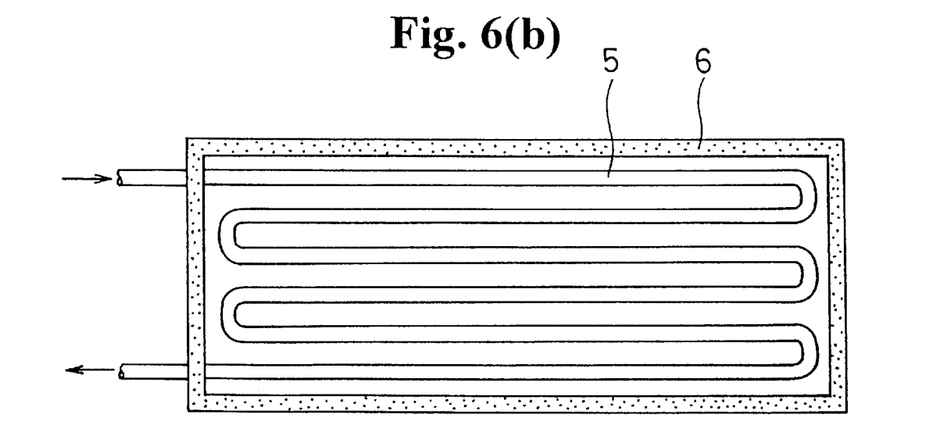

Further, in the embodiment shown in FIG. 1, the air duct 5 is laid to extend through the rainwater tank 6 and is in a loop-like shape at a predetermined depth in rainwater tank 6. In the rainwater tank 6, however, the air duct 5 may be bent, for example, in a rectangular spiral shape (see FIG. 6(*a*)) or a meandering shape (see FIG. 6(*b*)) in order to increase heat exchange efficiency between air in the air duct 5 and the rainwater in the rainwater tank 6.

In the following, an example of use of the embodiment of the present invention will be described. For example, fresh air is taken from outside of a room or from a space under a floor F into the air duct 5 through the fresh-air intake pipe 1 or the under-floor air intake pipe 2 as shown in FIG. 2(*c*) or FIG. 2(*b*), respectively. As shown in FIG. 5, air is dehumidified with the condensation dew basin 7 by removing condensation dew developed in a relatively small amount while passing through the air duct portion laid in the ground, and air is then led into the rainwater tank 6. Air in the air duct 5 is cooled with rainwater stored in the rainwater tank 6., Then, condensation dew developed on the inner wall of the air duct portion extending in the rainwater tank 6 in a large amount is removed with the condensation dew basin 7 to further dehumidify air in the air duct 5. For example, in the daytime in summer, fresh air taken through the fresh-air intake pipe 1 or the under-floor air intake pipe 2 is cooled with the rainwater to a temperature about 3° C. to 7° C. lower than its original temperature.

Figure 4:
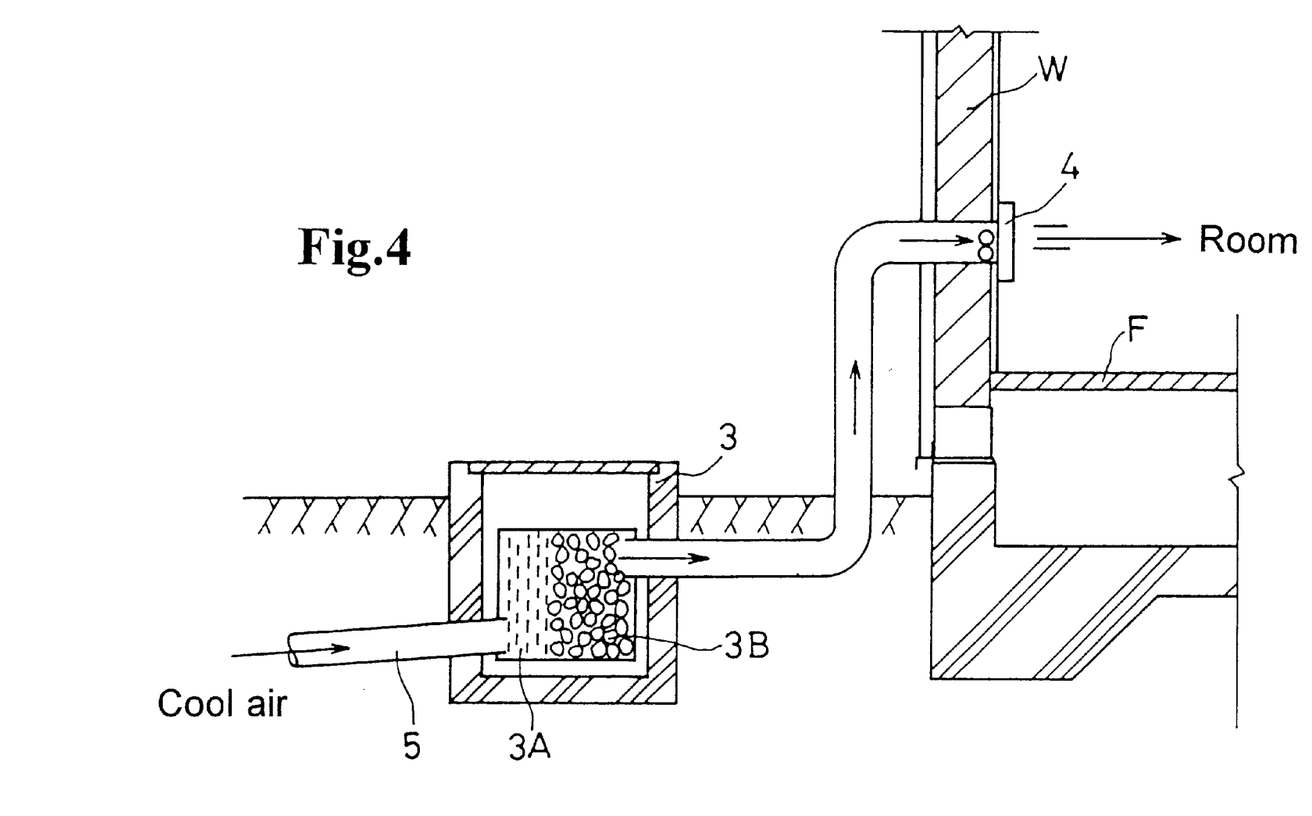
FIG. 4 is an explanatory sectional view showing an air-cleaning and deodorizing box, a fan and their vicinities.

Then, the cooled air is sent to the air-cleaning and deodorizing box 3, where the cooled air is cleaned and deodorized, and then supplied into the room by the fan 4, as shown in FIG. 4. If a relatively cooled air is introduced from a space under the floor F which has been cooled by radiation during the previous night, a larger temperature difference is attained between the ultimately cooled air derived therefrom and open or atmospheric air. In addition, effect of prolonging service life of foundations is obtained.

An appropriate room size to obtain cooling-effect is determined mainly by an effective volume of the rainwater tank 6 and an effective length of the portion of the air duct 5 submerged in water in the rainwater tank 6. As basic factors for the determination, there may be mentioned, for example, temperature difference between the air duct 5 and the fresh-air intake pipe 1 or under-floor air intake pipe 2 in summertime and relationship between the temperature difference and blowing power of the fan 4, relationship between an amount of water in the rainwater tank 6 and cooled air supplying power of the fan 4 (assuming that cooled air is intended to have a temperature, for example, about 3° C. lower than that of the original fresh air), relationship between a temperature of water of the rainwater tank 6 and a contact area with soil and depth of the rainwater tank 6, relationship between the length and temperature of the portion of the air duct 5 submerged in water in the rainwater tank 6, and material and diameter (which is closely related to air-flow rate) of the air duct 5.

As other applications of the embodiment, an air conditioning system for a simplified wine cellar in an ordinary house, and an air conditioning system for a food storeroom, such as a vegetable storeroom in an ordinary house or the like, may be mentioned. Further, the embodiment may be used in large-sized facilities, such as sports facilities and leisure facilities. For example, in such facilities, a pipe is so laid as to extend on a bottom of a swimming pool to cool air in the pipe, and cooled air is delivered to a control room or the like to reduce cooling load. Further, if the embodiment is used in cooperation with an air cooling apparatus, an initial temperature for the air cooling apparatus is lowered to reduced cooling load. In addition, if fresh air is introduced, cooling can be effected while ventilating. On the other hand, if the embodiment is applied to a heated swimming pool, a bathtub in a day-care center or the like, heating effect is obtained on the basis of the same principle as in the cooling.

The present invention is constructed as described above. In particular, according to the invention, there is provided the energy-saving and refreshing type air conditioning method utilizing rainwater and the system thereof, which are capable of efficiently supplying cooled air into a room by directly cooling air drawn from outside or inside of the room without using an indirect heat exchange medium in contrast to the conventional techniques, and which are simply constructed and substantially free from the troubles inherent in the conventional techniques and economically advantageous.

In other words, the air conditioning method comprises: passing air through the air duct extending through the rainwater tank embedded in the ground at a predetermined depth to cool air in the air duct; dehumidifying, cleaning and deodorizing air; and then supplying air into a room. Therefore, air is directly cooled with rainwater to supply cooled air into the room as opposed to the conventional types which comprise passing water as an indirect heat exchange medium through a pipe. Accordingly, the air conditioning method of the present invention has advantages that complicated pipe arrangement and troubles, such as water leakage due to the passing water through the pipe, can be eliminated; maintenance cost is considerably reduced; and the cooling effect is rapidly attained because cooled air is directly supplied into the room. Further, since air is directly supplied to the room instead of water as a heat exchange medium, energy consumption for the transfer is reduced. Moreover, in the method, air cooled with rainwater in the rainwater tank is supplied to the room. Accordingly, the system carrying out the method can be installed less dependently upon specific conditions of location and building and thus can be used widely.

According to the refreshing type air conditioning system utilizing rainwater, it comprises the fresh-air intake pipe or under-floor air intake pipe for taking fresh air therethrough, the air duct for passing air taken through the fresh-air intake pipe or under-floor air intake pipe, the rainwater tank embedded in the ground external to a room, the air duct being so laid as to extend through the rainwater tank at a predetermined depth in the rainwater tank to cool the air in the air duct, and the fan mounted on a wall or ceiling of the room for supplying cooled air into the room. Thus, there are advantages such that complicated pipe arrangement and troubles, such as water leakage due to the passing water through the pipe, can be eliminated; maintenance cost is considerably reduced; and since the outside air which is fresh is introduced, cooling and refreshing effect is enhanced.

According to the refreshing type air conditioning system utilizing rainwater, it comprises the air duct for passing air taken through the air outlet provided in a wall or ceiling of a room, the rainwater tank embedded in the ground external to the room, the air duct being so laid as to extend through the rainwater tank at a predetermined depth to cool air in the air duct, and the fan mounted on the wall or ceiling of the room for returning air to the room. Thus, advantages are provided such that complicated pipe arrangement and troubles, such as water leakage due to the passing water through the pipe, can be eliminated; maintenance cost is considerably reduced; and since air drawn from the room is circulated while being refreshed to return to the room, cooling and refreshing effect is enhanced.

According to the air conditioning system, the air duct has one end connected to the fresh-air intake pipe or under-floor air intake pipe through the condensation dew basin for dehumidification, and the other end connected to the power-adjustable fan mounted on the wall or ceiling through the condensation dew basin for dehumidification and the cleaning and deodorizing box; the fresh air is dehumidified with the condensation dew basin and cleaned and deodorized with the cleaning and deodorizing box, and is supplied to a room by the fan to result in ventilation of the room; the rainwater tank is embedded in the ground and always filled to repletion with rainwater; and the air duct is so laid as to extend through the rainwater tank at a predetermined depth in the rainwater tank to cool air in the air duct. Thus, advantages are provided such that complicated pipe arrangement and troubles, such as water leakage due to the passing water through the pipe, can be eliminated; maintenance cost is considerably reduced; and since the outside air which is fresh is introduced, cooling and refreshing effect is enhanced while effecting dehumidification and ventilation. Since the blowing power of the fan is adjustable, cooling power can be freely controlled by changing air-flow rate. Further, the system can be installed less dependently upon specific conditions of location and building and it can be used widely.

According to the air conditioning system, the air duct has one end connected to the air outlet provided in the wall or ceiling through the condensation dew basin for dehumidification and the other end connected to the blowing power-adjustable fan mounted on the wall or ceiling through the condensation dew basin for dehumidification and the cleaning and deodorizing box; air drawn from the room is dehumidified with the condensation dew basin and cleaned and deodorized with the cleaning and deodorizing box and is returned to the room by the fan; the rainwater tank is embedded in the ground and always filled to repletion with rainwater; and the air duct is so laid as to extend through the rainwater tank at a predetermined depth to cool air in the air duct. Thus, advantages are provided such that complicated pipe arrangement and troubles, such as water leakage due to the passing water through the pipe, can be eliminated; maintenance cost is considerably reduced; and since air drawn from the room is circulated while being refreshed to return to the room, cooling and refreshing effect is enhanced. Further, since the blowing power of the fan is adjustable, cooling power can be freely controlled by changing air-flow rate. In addition, the system can be installed less dependently upon specific conditions of location and building and thus can be used widely.

According to the air conditioning system wherein the air duct is in a loop-like shape, rectangular spiral-like shape or meandering shape at the predetermined depth in the rainwater tank, effective length of the air duct submerged in the rainwater tank can be changed freely. By virtue of this, power to supply cooled air to the room can be set freely and easily.

According to the air conditioning system wherein the air duct is made of a vinyl chloride resin pipe, cooling of air to be supplied to the room is efficiently effected with the rainwater tank.

According to the air conditioning system wherein rainwater stored in the rainwater tank may be used for flushing of a toilet or water sprinkling over a garden, and through an overflow pipe, excess rainwater is allowed to flow into the ground or drain into a water draining basin, rainwater in the rainwater tank can be used for a plurality of purposes including the flushing of a toilet or water sprinkling over a garden as well as cooling of air.

While the invention has been explained with reference to the specific embodiments of the invention, the explanation is illustrative and the invention is limited only by the appended claims.

What is claimed is:

1. An air conditioning system utilizing rainwater, comprising:
   an air duct for receiving and passing air therethrough,
   a water tank embedded in a ground outside a room, said air duct extending through the water tank at a predetermined depth to cool the air passing through the air duct,
   a condensation dew basin situated near the water tank and connected to the air duct for dehumidification, said condensation dew basin having at least one U-shaped connecting pipe connected to the air duct so that condensation dew in the pipe passes through the connecting pipe and enters into the condensation dew basin to thereby remove humidity from the air in the pipe, and
   a fan communicating with the air duct for supplying the air passing through the water tank into the room.

2. An air conditioning system according to claim 1, further comprising a condensation dew basin connected to the air duct for dehumidification.

3. An air conditioning system according to claim 2, further comprising an air-cleaning and deodorizing box connected to the air duct.

4. An air conditioning system according to claim 3, further comprising an air intake pipe for taking air therein and connected to the air duct.

5. An air conditioning system according to claim 3, wherein the air duct is connected to a portion outside the room, under the room or inside the room to receive air at said portion.

6. An air conditioning system according to claim 5, wherein said air duct has one end connected to an air intake pipe and the other end connected to the fan via the condensation dew basin and the cleaning and deodorizing box so that the air is dehumidified with the condensation dew basin, cleaned and deodorized with the cleaning and deodorizing box, and supplied to the room by the fan; said water tank is a rainwater tank embedded in the ground and filled with rainwater.

7. An air conditioning system according to claim 6, wherein said fan has adjustable air blowing power.

8. An air conditioning system according to claim 1, wherein said air duct has a bent portion to be arranged such that the bent portion forms a lowest portion between two portions sandwiching the bent portion, said connecting pipe being attached to the bent portion of the air duct.

9. An air conditioning system according to claim 8, wherein said condensation dew basin includes two connecting pipes attached to the air duct at a portion before air enters the water tank and a potion after the air passes through the water tank.

* * * * *